United States Patent
Levenstein

(10) Patent No.: US 6,226,625 B1
(45) Date of Patent: May 1, 2001

(54) VALUE SHARING METHOD FOR DETERMINING PRICING

(75) Inventor: Lawrence M. Levenstein, Santa Paula, CA (US)

(73) Assignee: C. M. & I. Technologies, Inc., Santa Paula, CA (US)

( * ) Notice: Subject to any disclaimer, the term of this patent is extended or adjusted under 35 U.S.C. 154(b) by 0 days.

(21) Appl. No.: 09/362,257

(22) Filed: Jul. 28, 1999

(51) Int. Cl.$^7$ .................................................. G06F 17/60
(52) U.S. Cl. ............................................. 705/400; 705/30
(58) Field of Search ................................. 705/1, 30, 400

(56) References Cited

U.S. PATENT DOCUMENTS

| | | | |
|---|---|---|---|
| 3,648,035 | * | 3/1972 | Hart et al. .............................. 700/34 |
| 4,208,712 | * | 6/1980 | Deutsch ................................... 700/3 |
| 5,249,120 | * | 9/1993 | Foley ....................................... 705/1 |
| 5,630,070 | * | 5/1997 | Dietrich et al. .......................... 705/8 |
| 5,745,880 | * | 4/1998 | Strothmann .............................. 705/7 |
| 5,970,476 | * | 10/1999 | Fahey ..................................... 705/28 |
| 6,038,540 | * | 3/2000 | Krist et al. ............................... 705/8 |
| 6,044,357 | * | 3/2000 | Garg ....................................... 705/10 |
| 6,157,916 | * | 12/2000 | Hoffman ................................. 705/8 |

FOREIGN PATENT DOCUMENTS 11-149589 * 6/1999 (JP) .

OTHER PUBLICATIONS

Dragoo et al: "Manage costs in real time"; Cost Engineering, Feb. 1994, v36, n2, pp. 11–14.*

Kim et al: "Pricong investment and production activities for an advanced manufacturing system"; Engineering Economist, Summaer 1997, v42, n4, pp. 303–324.*

"Profits Through Cost Accounting"; American Banker, Oct. 23, 1992, vol 157, No. 205, p. 4.*

Miller: "Target Costing for the Chapter 11 Business"; Bankruptcy Law Review, Winter 1992, v3, n4, pp. 51–53.*

* cited by examiner

Primary Examiner—Edward R. Cosimano
(74) Attorney, Agent, or Firm—Christie, Parker & Hale, LLP

(57) ABSTRACT

A method for determining the pricing at which a provider will provide and offering of goods and services to a customer. Under the method, at least one area of the customer's business in which using the provider's offering will create economic benefits for the customer is first identified. Next, money values are assigned to the at least one area of the customer's business in which use of the provider's offering will create economic benefits. The money values are then compiled by a computer system into an initial value share. In the next step, it is mathematically determined which portion of the initial value share will constitute the price at which the provider will provide the offering to the customer for an initial interval of time. After calculating the initial value share and after the initial interval of time, a new value share for a current interval is generated based upon a previously calculated value share for an immediately past interval.

15 Claims, 2 Drawing Sheets

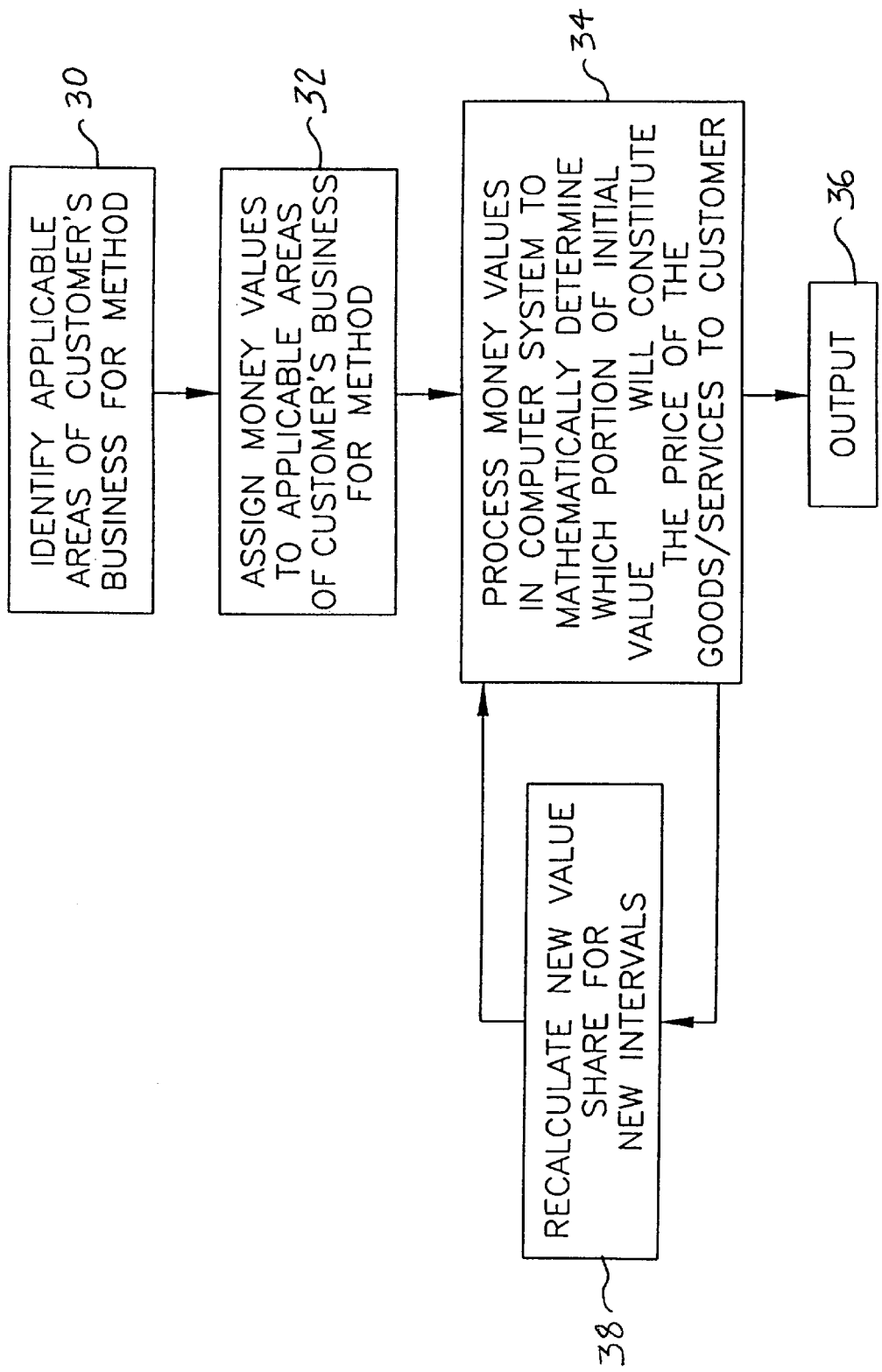

VALUE SHARING METHOD FOR DETERMINING PRICING

FIELD OF INVENTION

The invention relates generally to the field of pricing methods and more particularly to a pricing method that generates pricing of a provider's goods and services provided to a customer (the "offering") based upon a fair market price for goods of a commodity nature plus a sharing of the savings realized as a result of the customer implementing the provider's offering.

BACKGROUND OF THE INVENTION

Providers of goods and services expend great efforts in determining how to best price their goods and services. Providers of goods of a commodity nature (sometimes referred to as "parity products") are forced to price their goods at or below similar goods from competitors. That is also the case for providers of services that are of a commodity nature (sometimes referred to as "parity services.") In the case of completely new, proprietary products and services ("non-parity goods/services") provided in competition with commodity products and services, particularly in business settings as opposed to consumer settings, determining the value of the provider's goods and services to the buyer is helpful. If the customer (or potential customer) perceives the pricing model as being too expensive or having unattractive terms, the customer (or potential customer) may opt to look elsewhere or forego the goods/services. The customer's perception of the value of the goods/services is not static, and is influenced by a universe of constantly changing variables. Some businesses base their buying and procurement decisions largely on the lowest price for a commodity that meets the specification of the buyer or the payback period of the investment. Different customers also have different degrees of risk aversion. While some customers are willing to make more risky procurement decisions in order to maximize profitability, other customers are highly risk averse, and prefer avoiding risk if possible, even if this results in decreased profitability. All of these factors add complexity to the pricing process.

Traditionally, pricing of commodity goods and services in a business setting is arrived at by a bidding process and pricing of completely new, proprietary products and services is arrived at by negotiations between the provider of the goods and services and the customer. Further, traditionally, pricing of completely new, proprietary products and services in combination with commodity products and services is arrived at by negotiations between the provider and customer. After some back and forth, hopefully a meeting of the minds will result. Unfortunately, rather than building a sense of cooperation between the provider and customer, sometimes these negotiations can engender negative sentiments, particular if the transaction is not considered completely fair to both sides. Changing market conditions can force the seller and buyer to repeatedly reevaluate the pricing and other terms.

Accordingly, there remains a need for a pricing model and mechanism that assists the provider and customer at arriving at a mutually agreeable pricing structure that is flexible and responsive to market conditions, and that helps the parties establish equitable pricing of new goods and/or services in a manner that engenders a mutual feeling of cooperation and partnership. There is a further need for a pricing model that appeals to risk averse customers that desire a pricing structure that guarantees the customer that the decision to obtain goods and/or services from a provider will result in tangible and ascertainable economic benefits to the customer.

BRIEF DESCRIPTION OF THE INVENTION

The invention provides a pricing model and mechanism, termed the "Value Sharing Model", that guides the provider and customer at arriving at a mutually agreeable pricing for particularly identified goods and/or services (hereinafter the "offering"). The Value Sharing Model is based upon a concept of sharing the savings and other economic benefits resulting from the customer's use of the provider's offering.

Under the method of the invention, the provider and customer will first establish a Value Model. The Value Model is a set of equations, both linear and non-linear. Each equation is designed to estimate the value to a buyer of a specific benefit achievable from use of the provider's offering. The Value Model sets forth various aspects of the buyer's business and assigns time and number values for these components in the form of input information (e.g. monetary values) as it relates to the savings and other economic benefits to be computed by the customer implementing the provider's offering (the "program".) The provider and customer will preferably work together over time to identify the various areas of the customer's business where the goods/services can provide economic benefit, and will together preferably assign values to each component that will determine the Value Model. Savings in each applicable area of the customer's business realized as a result of following the program will be determined, on a per unit savings and/or on an annualized company wide basis. The input, updating, model and calculation of the Value Model will preferably incorporate a computer and data processing system.

Next, the Value Share will be determined. The Value Share is the calculation that determines the price of the goods and services in excess of the market-determined price for each and every commodity product and/or service charged by the provider to the customer. The Value Share preferably depends upon three factors, namely: (1) the level of customer's business activity; (2) the percentage of customer's particular products and services provided by the provider; and (3) the percentage of roll out of the program.

As with the calculation of the Value Model, the method of the invention will utilize a computer and data processing system to allow convenient entry of data and processing of data.

In one preferred embodiment of the invention, the Value Share for a given month in a current Interval can be calculated using the following formula:

$$VS_{P+i} = (VS_P / BAM_P)(BAM_{P+i} / PT_{P+i})(RPT_{P+i})$$

Where:

P=the immediately past Interval;

P+i=a given calendar month in the current Interval;

$VS_P$=a predetermined percentage of the Value Share calculated for P ($VS_P$ will be estimated for the first Interval);

$VS_{P+i}$=Value Share for P+i;

$BAM_P$=Business Activity Measure for P;

$BAM_{P+i}$=Business Activity Measure for P+i;

$PT_{P+i}$=Percentage of customer's total particular products and service needs obtained from provider in a given calendar month in the current Interval; and $RPT_{P+i}$=Percentage of completion of program for the customer.

The BAM will be defined for a customer's particular business, and will preferably be a collaborative effort between the customer and the provider, or some third party facilitator.

The provider and customer will jointly determine the Interval to be used to analyze the Value Model and the Value Share. The Interval will typically be one year, but can be a shorter or longer period of time. A new Interval starts immediately upon expiration of a previous Interval. The Interval may be adjusted from time to time as required by the provider and customer.

After the expiration of each Interval, the provider and customer can mutually agree on a readjustment of the Value Share to reflect the then current estimates of the actual value of the offering to the customer for the just completed Interval. The applicable formula set forth above can be recalculated using the actual results for the determinants of the value to customer for the completed Interval ("Adjusted Value Share"). The amount by which the Adjusted Value Share is greater or lesser than the Value Share can be paid, debited or credited by the provider or customer, whichever is the case, to the other party. For added fairness, an independent consultant can do the Value Share calculation. These calculations can be handled well by a computer system.

The invention thus provides method for determining the pricing at which a provider provides an offering of particular goods and services to a customer, comprising the steps of:

identifying at least one area of the customer's business in which the provider's offering will create economic benefits for the customer;

assigning money values to each and every known economic benefit in the at least one area of the customer's business in which use of the provider's offering will create economic benefits for the customer;

compiling the money values into an initial value share, preferably in a computer system; and mathematically determining which portion of the initial value will comprise that segment of the price at which the provider will provide the offering to the customer in excess of any and all market prices for commodities (undifferentiated products or services) included in the offering.

Also, based on new information collected by the provider, the customer, the provider and customer in combination, or an independent third party, the Value Model is continually improved by way of:

1. Re-estimation of attendant coefficients;
2. Addition of new equations;
3. Deletion of old equations;
4. Addition of independent variable(s) to old equations; and
5. Deletion of independent variable(s) from old equations.

As an example, a previously thought to be important factor might be discovered to be of negligible economic importance, and new factors might be discovered to have great economic significance.

BRIEF DESCRIPTION OF THE DRAWINGS

FIG. 2 is a flowchart showing another presentation of the method of the invention.

DETAILED DESCRIPTION OF THE PREFERRED EMBODIMENTS

Figure 1:
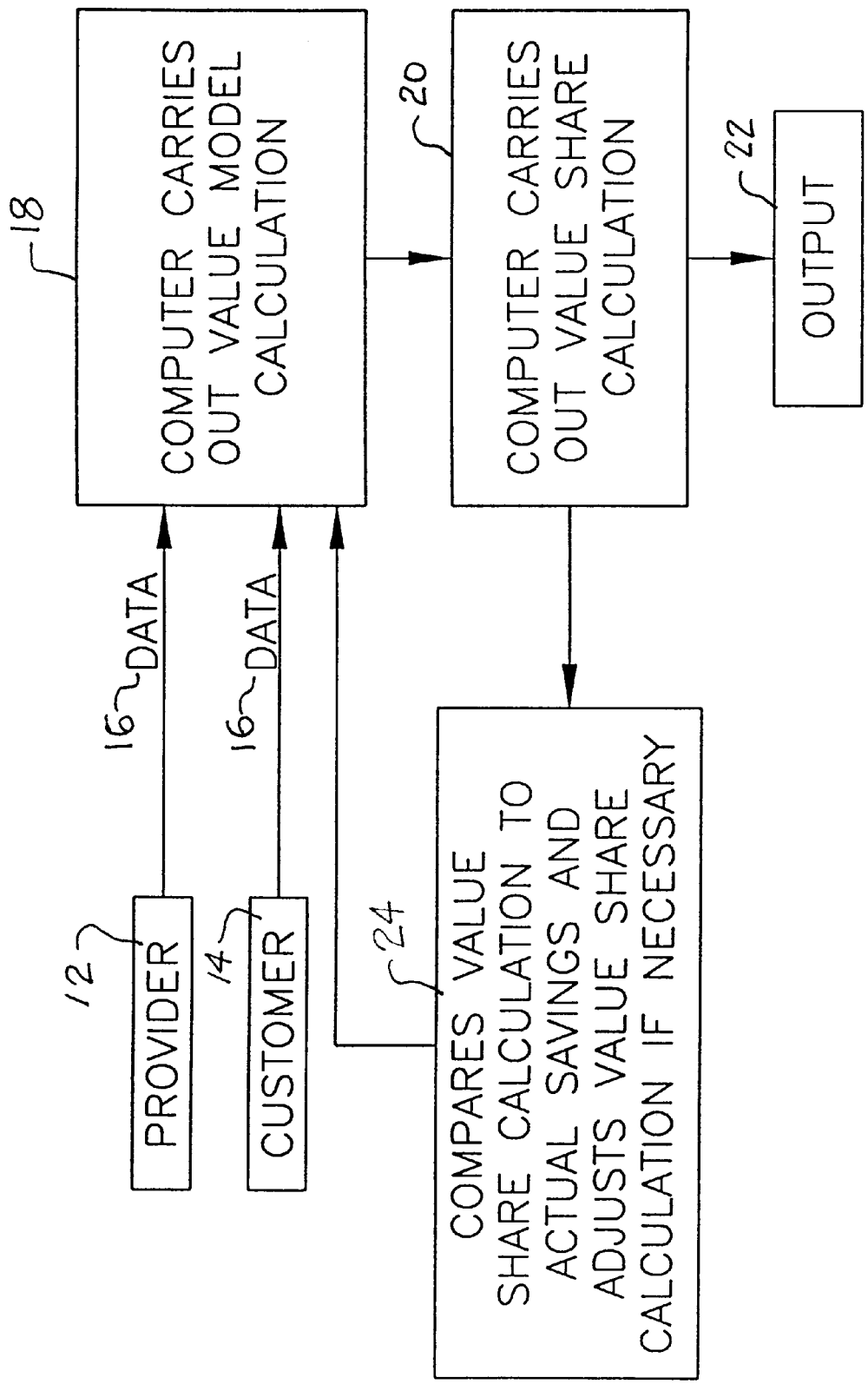
FIG. 1 is a flow chart showing the method of the invention.

Under the method of the invention, the provider and customer will first establish a Value Model. The Value Model sets forth a set of equation. Each equation has as its dependent variable one economic benefit to customer's business from use of the offering in and by customer's business. That is, the Value Model sets forth various aspects of the customer's business and assigns time and number values for these components in the form of input information about the customer's business as it relates to the savings and other economic benefits to be computed by use of the provider's offering (the "program".) Savings in each applicable area of the customer's business realized as a result of following the program will be determined, either on a per unit savings and/or on an annualized basis.

For example, if the provider's offering comprises providing a new grease delivery system that replaces the customer's prior grease delivery system, some inputs in the Value Model would include the labor rate, the time savings in using, cleaning, and maintaining the new grease delivery systems as compared to the replaced grease delivery system, grease savings as a result of less waste, lower environmental compliance costs, and lower equipment acquisition costs. Two sample factors and their calculation that could be used in the overall Value Model are set forth below.

EXAMPLE 1 OF VALUE TO THE CUSTOMER ("VTC"—GREASE)

BENEFIT: ELIMINATE EMPLOYEE CONTAINER CLEANING COSTS

| | | |
|---|---|---|
| Labor Rate (Burdened) | = $35.00/hr. | A. |
| Traditional Cleaning Time* | = 30 Minutes | B. |
| Oil Bank Cleaning Time | = 0 Minutes | C. |
| Grease Volume per Container | = 120 lbs. Keg; 400 lbs Drum | D. |

(*Time to squeeze the liner or clean out the container)

$$VTC = \frac{X(30 \text{ min.} - 0 \text{ min.}) \; 35/hr.}{60 \text{ min/hr} \; X(\text{lbs., keg or lbs., drum})} = \$0.15/\text{lbs, keg}; \$0.04/\text{lbs, drum}$$

Questions for Actual Customer:

| | | |
|---|---|---|
| Labor Rate per Hour | = $_____ | A. |
| Traditional Cleaning Time | = _____ | B. |
| Oil bank Cleaning Time | = 0 Minutes | C. |
| Container Grease Vol. | = _____ | D. |

SAVINGS PER POUND OF GREASE $$VTC = \frac{A \; X(B - C)}{60 \; X \; D} = \$\frac{X(\; - \;)}{60 \; X\_}$$

EXAMPLE 2 OF VALUE TO THE CUSTOMER ("VTC"—GREASE)

BENEFIT: LOWER EMPLOYEE HOUSEKEEPING COSTS

| | | |
|---|---|---|
| Labor Rate (Burdened) | = $35.00/hr. | A. |
| Traditional Cleaning Time* | = 60 Minutes** | B. |
| Oil Bank Cleaning Time | = 0Minutes | C. |
| Number of Grease Pumps | = 16 Pumps | D. |
| Average Grease Volume per Mo. | = 12,000 lbs | E. |

(*time Clean up Area Around Drum Pump)

-continued

BENEFIT: LOWER EMPLOYEE HOUSEKEEPING COSTS (**per Grease Pump per Month)

$$VTC = \frac{\$35/hr \times (60 \text{ min/pump/mo} - 0) \times 16 \text{ pumps}}{60 \text{ min/hr}} = \$0.05/lb.$$
$$(12,000 \text{ lbs/mon})$$

Questions for Actual Customer:

| | | |
|---|---|---|
| Labor Rate per Hour | = $_____ | A. |
| Traditional Cleaning Time | = _____ | B. |
| Oil Bank Cleaning Time | = 0Minutes | C. |
| Number of Grease Pumps | = _____ | D. |
| Monthly Grease Volume | = _____ | E. |
| SAVINGS PER POUND OF GREASE | | |

$$VTC = \frac{A \times (B-C) \times D}{60 \times E} = \$\frac{X(\ -\ )}{60 \times \_}$$

Many other more factors would apply to grease systems, and other factors would apply to other goods/services to be supplied by a provider to the customer.

The Value Model will output not only the total savings achievable by implementing the program, but will also preferably output the savings in the various areas of the customer's business. For example, some savings might include savings from lower container cleaning costs, lower installation, maintenance, and operational costs, lower worker's compensation claims as a result of added safety, and lower environmental compliance costs, just to name a few.

Referring to FIG. 1, the provider 12 and customer 14 can both preferably enter data 16; into a computer system, which computer system will carry out the value model calculation 18. Use of a computer allows for efficient data entry, constant updating as well as consistent and reliable results.

Next, the Value Share will be determined. A computer system (preferably the same system) carries out the value share calculation 20 and produces output 22. See FIG. 1. The Value Share is a mathematical calculation that determines the price of the goods and services charged by the provider to the customer in excess of any and all market price for commodity (undifferentiated) products and/or services included in the offering. In a first embodiment of the invention, the Value Share will include three factors that act on a Value Share. These three factors mathematically account for: (1) the level of customer's business activity; (2) the percentage of customer's particular products and services provided by the provider; and (3) the percentage of roll out of the program. The Value Share for each Interval will nominally provide a monetary calculation of the non-commodity portion of the cost of the program to the customer. Most importantly, however, since the calculated cost of the program is derived directly from new savings realized by the customer following use of the provider's program, the program will never actually "cost" the customer anything, but will instead comprise a structure for sharing the savings achieved by the customer using and/or implementing the provider's offering.

In a first embodiment of the invention, the Value Share for a given month in a current Interval is calculated using the following formula:

$$VS_{P+i} = (VS_P/BAM_P)(BAM_{P+i}/PT_{P+i})(RPT_{P+i})$$

Where:
P=the immediately past Interval;
P+i=a given calendar month in the current Interval;
$VS_P$=a predetermined percentage of the value determined by the Value Model and calculated for P ($VS_P$ will be estimated for the first Interval);
$VS_{P+i}$=Value Share for P+i;
$BAM_P$=Business Activity Measure for P;
$BAM_{P+i}$=Business Activity Measure for P+i;
$PT_{P+i}$=Percentage of customer's total particular products and service needs obtained from provider in a given calendar month in a current Interval; and
$RPT_{P+i}$=Percentage of completion of program for the customer.

The BAM will be defined for customer's particular business, and will preferably be decided under a collaborative effort between the customer and the provider (or some unit of the provider or customer.) The BAM can be measured in terms of easily identified measures of the customer's business. For example, if the customer is a railroad freight company, the BAM might be measured in terms of rail car loadings. For a manufacturer, the BAM might be measured in terms of output of manufactured goods.

In order to optimize the system, the customer and provider will be responsible for fully implementing the program. Since completion will typically be defined either in a specific number of locations or other easily known units, the percentage of completion of the program for the customer (as this will affect the Value Share for each Interval) will be known to both parties on an on-going basis.

The provider and customer will jointly determine the Interval to be used to analyze the Value Share. The Interval will typically be one year, but can be a shorter or longer period of time. A new Interval starts immediately upon expiration of a previous Interval. The Interval may be adjusted from time to time as required by the provider and customer. Also, while the above formula is directed to calculate the value share for a given month in a current Interval, value shares can be calculated for given quarters or other time periods in a current Interval as well.

As noted above, prior to the first Interval, there may not yet exist empirical data as to what the total economic benefit of the program is to the customer. In order to begin the process, the parties will preferably, after consultation, use an estimated Value Share for the first Interval. Thereafter, in the second and subsequent Intervals, actual data will be available, and the parties will be able to utilize additional research on economic benefits to the customer's business from use of provider's offering during the prior Interval to calculate upcoming results for new Intervals. The inventor anticipates that as the process becomes more established in various industries and businesses, the process of estimating accurate Value Shares for the initial Interval will become more exact.

After the expiration of each Interval, the provider and customer can mutually agree on a readjustment of the Value Share to reflect the then current estimates of the actual value of the particular goods and services to the customer for the just completed Interval 24 (see FIG. 1.). The applicable formula set forth above can be recalculated using the actual results for the determinants of the value to the customer for the completed Interval ("Adjusted Value Share"). The amount by which the Adjusted Value Share is greater or less than the Value Share can be paid, debited or credited by the provider or customer, whichever is the case, to the other party. For added fairness, an independent consultant can do the Value Share calculation.

The $VS_P$ in the above formula can be set to a percentage number that best comports to the benefit sharing the parties decide is equitable. For example, the percentage number of the Value Share calculated for P, the immediate past Interval, can be set at 50%. Selection of 50% would (assuming the other factors do not change the calculation) establish a 50—50 sharing of the savings realized as a result of implementing the program. However, other percentages may be chosen to allocate the savings in a different manner if the parties so desire (e.g. with more of the savings going to the customer.) The component of the formula $1/PT_{P+i}$ (where $PT_{P+i}$ is the percentage of the customer's total products/service needs obtained from provider) provides a factor that increases the value of having a provider provide for most of or all of customer's needs of provider's goods/services, because as the percentage of customer's total particular products and service needs obtained from provider drops below 100%, $1/PT_{P+i}$ becomes larger than one, causing the Value Share for the Interval to rise. Indeed, if the customer obtains 50% or less of particular products and service needs, the factor becomes two or greater, which would potentially require the customer to pay over 100% of the value imparted to the customer as a result of implementing the program. The last factor of the Value Share calculation, $RPT_{P+i}$ (percentage of completion of program for the customer), takes into account situations where there is less than full implementation of the program, and adjusts downwardly the amount due to provider under the program. Indeed, some implementation programs are quite large and/or complex, so may take more than one interval to complete.

It is also possible for the equation to be expanded somewhat to include in the factor $PT_{P+i}$ not only the percentage of customer's total particular products and service needs obtained from provider, but also the customer's total needs in a particular area. For example, in the petroleum products areas, the provider might provide grease and delivery services to the customer, but not lubricating oil. If the provider is linked to a supplier of lubricating oil, this factor can be made to be weighted based upon the customer total petroleum needs (namely, their grease and lubricating oil needs) rather than on the provider's grease and delivery service. Done in this manner, the customer is incentivized to satisfy all the customer's needs from one supplier.

Thus, as set forth in FIG. 2 in its most general embodiment, the invention provides a method for determining the pricing at which a provider provides goods and services to a customer, comprising the steps of:

identifying at least one area of the customer's business in which using the provider's offering will create economic benefits for the customer 30;

assigning money values to each and every then known economic benefit in at least one area of the customer's business in which use of the provider's offering will create economic benefits for the customer 32;

compiling the money values into an initial value, preferably in a computer system; and mathematically determining which portion of the initial value will comprise that segment of the price at which the provider will provide the offering to the customer in excess of any and all market prices for commodities (undifferentiated products or services) included in the offering 34, and producing output 36;

wherein after the initial value share is determined and after the initial interval of time, a new value share for a current interval is generated based upon a previously calculated value share for an immediately past interval 38.

The step of identifying at least one area of the customer's business in which using the provider's goods and services will create one or more economic benefits for the customer is preferably carried out jointly by the provider and customer.

The step of identifying at least one area of the customer's business in which using the provider's goods and services will create economic benefits for the customer is carried out with input by the provider and the customer.

Optionally, any or all of the above steps can be carried out by an independent third party.

The step of assigning money values to the customer's economic benefits is preferably carried out with input by the provider and customer.

The step of mathematically determining which portion of the value will comprise part of the price at which the provider will provide the offering to the customer is preferably accomplished by multiplying the initial value share by a factor which accounts for the percentage implementation and utilization of the provider's offering.

The step of mathematically determining which portion of the value share will comprise part of the price at which the provider will provide goods and services to the customer is preferably accomplished by multiplying the initial value share per initial unit of business activity by a factor which accounts for the level of business activity of the customer.

The entire method of the invention is preferably implemented on a computer system including data entry means, data processing and storage means, and display/output means. As stated above, while the method could conceivably be made manually, use of a computer system, especially one accessible via the worldwide computer network will allow the provider and customer to collaborate in entering and updating data permits large quantities of data to be manipulated accurately, and makes historical data readily available for making better future estimates.

The foregoing description is not intended to represent the only form of the invention in regard to the details of its methodology and manner of operation. In fact, it will be evident to one skilled in the art that modifications and variations may be made without departing from the spirit and scope of the invention. Although specific terms have been employed, they are intended in a generic and descriptive sense only and not for the purpose of limitation.

What is claimed is:

1. A method for determining the pricing at which a provider provides an offering of goods and services to a customer, comprising the steps of:

identifying at least one area of the customer's business in which using the provider's offering will create economic benefits for the customer;

assigning money values to at least one area of the customer's business in which use of the provider's offering will create economic benefits for the customer;

inputting the money values into a computer system and utilizing the computer system to compile the money values into an initial value share per initial unit of business activity; and utilizing a computer system to mathematically determining which portion of the initial value will comprise that segment of the price at which the provider will provide the offering to the customer in excess of any and all market prices for commodities included in the offering;

wherein after the initial value share is determined and after the initial interval of time, a new value share for a current interval is generated by the computer system based upon a previously calculated value share for an immediately past interval.

2. The method for determining the pricing at which a provider provides the offering to a customer of claim 1, wherein the step of using a computer to mathematically determine which portion of the value will comprise the price at which the provider will provide the offering to the customer is accomplished by adjusting the initial value share per initial unit of business activity to account for the percentage of implementation and utilization by the customer of the provider's offering.

3. The method for determining the pricing at which a provider provides the offering to a customer of claim 1, wherein the step of using the computer to mathematically determine which portion of the value will comprise the price at which the provider will provide the offering to the customer is accomplished by adjusting the initial value per initial unit of business activity to account for the level of business activity of the customer.

4. A method for determining the pricing at which a provider provides the offering to a customer, comprising the steps of:

identifying at least one area of the customer's business in which using the provider's offering will create economic benefits for the customer;

assigning money values to at least one area of the customer's business in which use of the provider's offering will create economic benefits for the customer;

compiling the money values into an initial value share per initial unit of business activity; and mathematically determining which portion of the initial value will comprise that segment of the price at which the provider will provide the offering to the customer in excess of any and all market prices for commodities included in the offering.

5. The method for determining the pricing at which a provider provides the offering to a customer of claim 4, wherein after the initial value share is determined and after the initial interval of time, a new value share for a current interval is generated based upon a previously calculated value share for an immediately past interval.

6. The method for determining the pricing at which a provider provides the offering to a customer of claim 4, wherein the step of determining at least one area of the customer's business in which using the provider's offering will create economic benefits for the customer is carried out jointly by the provider and customer.

7. The method for determining the pricing at which a provider provides the offering to a customer of claim 4, wherein the step of assigning money values to at least one area of the customer's business in which use of provider's the offering will create economic benefits for the customer is carried out jointly by the provider and customer.

8. The method for determining the pricing at which a provider provides the offering to a customer of claim 4, wherein the step of mathematically determining which portion of the value will comprise the price at which the provider will provide the offering to the customer is accomplished by adjusting the initial value share per initial unit of business activity to account for the percentage of implementation and utilization of the provider's offering.

9. The method for determining the pricing at which a provider provides the offering to a customer of claim 4, wherein the step of mathematically determining which portion of the value will comprise the price at which the provider will provide the offering to the customer is accomplished by adjusting the initial value share per initial unit of business activity to account for the level of business activity of the customer.

10. A method for determining the pricing at which a provider provides an offering of goods and services to a customer, comprising the steps of:

identifying at least one area of the customer's business in which using the provider's offering will create economic benefits for the customer;

assigning money values to at least one area of the customer's business in which use of the provider's offering compiling the money values into an initial value share per initial unit of business activity; and mathematically determining which portion of the initial value will comprise that segment of the price at which the provider will provide the offering to the customer in excess of any and all market prices for commodities included in the offering;

wherein after the initial value share is determined and after the initial interval of time, a new value share for a current interval is generated based upon a previously calculated value share for an immediately past interval.

11. The method for determining the pricing at which a provider provides the offering to a customer of claim 10, wherein the step of mathematically determining which portion of the value will comprise the price at which the provider will provide the offering to the customer is accomplished by multiplying the initial value share per initial unit of business activity by a factor which accounts for the percentage of implementation and utilization of the provider's offering.

12. The method for determining the pricing at which a provider provides the offering to a customer of claim 10, wherein the step of mathematically determining which portion of the value will comprise the price at which the provider will provide the offering to the customer is accomplished by multiplying the initial value share per initial unit of business activity by a factor which accounts for the level of business activity of the customer.

13. A method for determining the pricing at which a provider provides an offering of goods and services to a customer, comprising the steps of:

identifying at least one area of the customer's business in which using the provider's offering will create economic benefits for the customer;

assigning money values to at least one area of the customer's business in which use of the provider's offering will create economic benefits for the customer;

inputting the money values into a computer system and utilizing the computer system to compile the money values into an initial value share per initial unit of business activity; and utilizing a computer system to mathematically determine which portion of the initial value will comprise that segment of the price at which the provider will provide the offering to the customer in excess of any and all market prices for commodities included in the offering for a given calendar month in a current interval, the step of mathematically determining using the following formula:

$$VS_{P+i}=(VS_P/BAM_P)(BAM_{P+i}/PT_{P+i})(RPT_{P+i})$$

Where:
P=the immediately past Interval;
P+i=a given calendar month in the current Interval;
$VS_P$=a predetermined percentage of the Value calculated for P ($VS_P$ will be estimated for the first Interval);
$VS_{P+i}$=Value Share for P+i;
$BAM_P$=Business Activity Measure for P;
$PT_{P+i}$=Percentage of customer's total particular products and service needs obtained from provider in a given calendar month in a current Interval; and
$RPT_{P+i}$=Percentage of completion of program for the customer, and wherein after the initial value share is determined and after the initial interval of time, a new value share for a current interval is generated by the computer system based upon a previously calculated value share for an immediately past interval.

14. A method for determining the pricing at which a provider provides the offering to a customer, comprising the steps of:

identifying at least one area of the customer's business in which using the provider's offering will create economic benefits for the customer;

assigning money values to at least one area of the customer's business in which use of the provider's offering will create economic benefits for the customer;

compiling the money values into an initial value share per initial unit of business activity; and mathematically determining by a formula which portion of the initial value will comprise that segment of the price at which the provider will provide the offering to the customer in excess of any and all market prices for commodities included in the offering for a given calendar month in a current interval, the formula comprising:

$$VS_{P+i}=(VS_P/BAM_P)(BAM_{P+i}/PT_{P+i})(RPT_{P+i})$$

Where:
P=the immediately past Interval;
P+i=a given calendar month in the current Interval;
$VS_P$=a predetermined percentage of the Value calculated for P ($VS_P$ will be estimated for the first Interval);
$VS_{P+i}$=Value Share for P+i;
$BAM_P$=Business Activity Measure for P;
$BAM_{P+i}$=Business Activity Measure for P+i;
$PT_{P+i}$=Percentage of customer's total particular products and service needs obtained from provider in a given calendar month in a current Interval; and
$RPT_{P+i}$=Percentage of completion of program for the customer.

15. A method for determining the pricing at which a provider provides an offering of goods and services to a customer, comprising the steps of:

identifying at least one area of the customer's business in which using the provider's offering will create economic benefits for the customer;

assigning money values to at least one area of the customer's business in which use of the provider's offering will create economic benefits for the customer;

compiling the money values into an initial value share per initial unit of business activity; and mathematically determining by a formula which portion of the initial value will comprise that segment of the price at which the provider will provide the offering to the customer in excess of any and all market prices for commodities included in the offering for a given calendar month in a current interval, the formula comprising;

$$VS_{P+i}=(VS_P/BAM_P)(BAM_{P+i}/PT_{P+i})(RPT_{P+i})$$

Where:
P=the immediately past Interval;
$BAM_{P+i}$=Business Activity Measure for P+i;
$PT_{P+i}$=Percentage of customer's total particular products and service needs obtained from provider in a given calendar month in a current Interval; and
$RPT_{P+i}$=Percentage of completion of program for the customer; and wherein after the initial value share is determined and after the initial interval of time, a new value share for a current interval is generated based upon a previously calculated value share for an immediately past interval.

* * * * *

UNITED STATES PATENT AND TRADEMARK OFFICE
CERTIFICATE OF CORRECTION

PATENT NO. : 6,226,625 B1
DATED : May 1, 2001
INVENTOR(S) : Lawrence M. Levenstein It is certified that error appears in the above-identified patent and that said Letters Patent is hereby corrected as shown below:

<u>Title page,</u>
Item [73], the Assignee should read:
-- C.H. & I. Technologies, Inc., Santa Paula, CA (US) --

Item [57], ABSTRACT,
Line 2, replace "provide and offering" with -- provide an offering --.

<u>Column 8,</u>
Lines 66-67, replace "determining" with -- determine --.

<u>Column 9,</u>
Lines 62-63, replace "of provider's the offering" with -- of the provider's offering --.

<u>Column 10,</u>
Line 22, after "use of the provider's offering" insert -- will create economic benefits for the customer; --.

Signed and Sealed this

Thirteenth Day of August, 2002

*Attest:*

*Attesting Officer*

JAMES E. ROGAN
*Director of the United States Patent and Trademark Office*